United States Patent [19]
Mahapatra et al.

[11] Patent Number: 4,715,027
[45] Date of Patent: Dec. 22, 1987

[54] INTEGRATED OPTIC MULTI/DEMULTIPLEXER

[75] Inventors: Amaresh Mahapatra, Lexington; Donald H. McMahon, Carlisle, both of Mass.

[73] Assignee: Polaroid Corporation, Cambridge, Mass.

[21] Appl. No.: 868,098

[22] Filed: May 29, 1986

[51] Int. Cl.$^4$ .............................................. H04B 9/00
[52] U.S. Cl. ..................................... 370/3; 350/96.12; 350/162.22
[58] Field of Search .............. 370/3; 350/96.11, 96.12, 350/96.19, 162.17, 162.2, 162.21, 162.22, 162.23; 356/334, 305

[56] References Cited

U.S. PATENT DOCUMENTS

| | | | |
|---|---|---|---|
| 3,863,063 | 1/1975 | Indig et al. | 370/3 |
| 4,279,464 | 7/1981 | Colombini | 350/96.12 |
| 4,449,782 | 5/1984 | Korth | 350/96.16 |
| 4,547,262 | 10/1985 | Spillman, Jr. et al. | 350/96.12 |
| 4,634,215 | 1/1987 | Reule | 350/96.16 |
| 4,634,219 | 1/1987 | Suzuki | 350/162.22 |

FOREIGN PATENT DOCUMENTS

| | | | |
|---|---|---|---|
| 55-149911 | 11/1980 | Japan | 350/96.11 |
| 56-60401 | 5/1981 | Japan | 350/96.19 |
| 57-6812 | 1/1982 | Japan | 350/96.11 |
| 57-177104 | 10/1982 | Japan | 370/3 |
| 1394747 | 5/1975 | United Kingdom | 350/96.12 |

OTHER PUBLICATIONS

Miki-"A Design Concept", NTG-Faehber (Germany), vol. 73, 1980, pp. 41–45.

Wavelength Multiplexing Components—A Review of Single-Mode Devices and Their Applications, Gerhard Winzer, Journal of Lighwave Technology, vol. LT-2, No. 4, Aug. 1984, pp. 369–378.

Review and Status of Wavelength-Division-Multiplexing Technology and Its Application, Ishio et al, Journal of Lightwave Technology, vol. LT-2, No. 4, Aug. 1984, pp. 448–463.

Primary Examiner—Joseph A. Orsino, Jr.
Attorney, Agent, or Firm—Francis J. Caufield

[57] ABSTRACT

Integrated optic devices incorporating echelon gratings suitable for use in performing multi/demultiplexing functions in optical communications systems. The echelon gratings can be either reflection or transmissive types and are conveniently formed using conventional photolithographic techniques.

13 Claims, 6 Drawing Figures

INTEGRATED OPTIC MULTI/DEMULTIPLEXER

BACKGROUND OF THE INVENTION

This invention in general relates to optical communications and in particular to integrated optic grating multiplexers.

Wavelength division multiplexing (WDM), the simultaneous transmission of several signals on a single path, is a technology that is fundamentally important in fiber based communications sytems because of its impact on system configuration, performance, and cost. One major advantage of this technology is its ability to increase system capacity by increasing the number of channels that can be carried per fiber. With increased capacity, fiber requirements and associated fiber costs decrease, and already installed systems can more easily be upgraded to handle subsequent increases in traffic. Also, different modulation schemes can be used on assignable channels to enhance flexibility and overall system design.

Wavelength selective multi-demultiplexers may be classified as active, such as multiwavelength sources or detectors, or passive, such as dielectric filters and angularly dispersive devices like prisms or gratings. Various forms of passive gratings are known. Among them are included line gratings and Fresnel gratings. These kinds of gratings have been proposed and also demonstrated as evidenced by the literature. All high resolution gratings require submicron lithography, or equivalent precision fabrication, since the line periodicity required for adequate resolution is of the order of a wavelength. Consequently, it is relatively difficult to exploit conventional photolithographic integrated optics fabrication technology to manufacture line gratings to the precision required for WDM applications.

However, another type of grating, the echelon grating, is well known in bulk optics and can achieve the high resolution needed for WDM purposed which supplies high relative precision without the need for the high periodicity of the line gratings. Because of the importance of wavelength division multiplexing technology, and the difficulty of easily fabricating angularly dispersive devices, it is a primary object of the present invention to provide an integrated optic echelon grating that can be easily fabricated.

It is another object of the present invention to provide an integrated optic echelon grating that can be fabricated utilizing conventional photolithographic and etching techniques.

Other objects of the invention will in part be obvious and in part appear hereinafter when read in connection with the detailed description to follow.

SUMMARY OF THE INVENTION

This invention in general relates to optical communications and in particular to integrated optic devices incorporating echelon gratings suitable for use in mutli/demultiplexing functions. Up to 50 or more channels separated by an Angstrom or less can be effectively prepared.

The echelon gratings incorporated in the devices may be either transmissive or reflective types, but the reflective is preferred because it has certain advantages over the transmissive. Other components can be integrally formed to cooperate with the echelon gratings and all can be conveniently formed using conventional micron photolithography and ething techniques.

The devices can be structured to separate 50 or more channels by less than one Angstrom and more than 10 Angstroms. The devices, preferably however, are structured to handle between 20 and 50 channels separated by between 1 (fine) and 10 (coarse) Angstroms.

One preferred embodiment includes a curved reflection grating that is achromatized and has focusing properties. The echelon gratings of all of the embodiments, however, whether transmissive or reflective types, are structured to receive a plurality of multiplexed channels in a given range of wavelengths and diffract them into separate channels by angularly dispersing them with respect to one another so that the channels are spatially separated for subsequent coupling and use.

DESCRIPTION OF THE DRAWINGS

The novel features that are considered characteristic of the invention are set forth with particularity in the appended claims. The invention, itself, however, both as to its organization and method of operation and fabrication, together with other objects and advantages thereof, will best be understood from the following detailed description of the illustrated embodiment and fabrication steps when read in connection with the accompanying drawings wherein like numbers have been employed in the different figures to denote the same parts and wherein:

DETAILED DESCRIPTION

This invention relates to the structure of various integrated optic echelon gratings suitable for use in separating multiplexed communications channels up to 50 or more in number and separated in wavelength by less than one Angstrom.

The echelon grating structures may be either transmissive or reflective types, although the reflective type has certain advantages and is therefore preferred. Other components are shown as integral members along with the inventive integrated optic echelon gratings and all can conveniently be fabricated using conventional photolithographic, etching, and diffusion technology. The devices preferably are fabricated to handle 20 to 50 channels separated by as little as 1 Angstrom, which is considered fine channel resolution, and as much as 10 Angstroms, coarse resolution. This performance is easily achievable using micron photolithography and etching and is a consequence of recognizing the applicability of the echelon grating to the problems associated with WDM.

Figure 1:
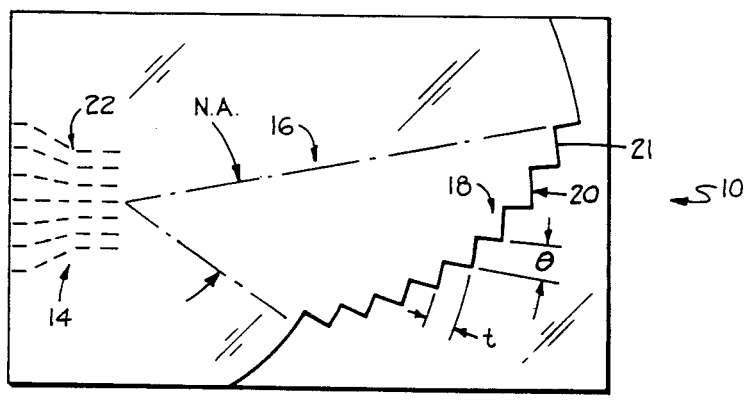
FIG. 1 is a diagrammatic plan view of a reflection version of the integrated optic device of the invention.
Figure 2:
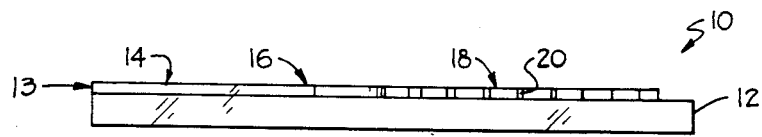
FIG. 2 is a diagrammatic elevation view of the device of FIG. 1.

A preferred structure for an integrated optic device incorporating the echelon grating of the invention is shown in FIGS. 1 and 2 where it is generally designated by the numeral 10. Device 10 utilizes a reflection-type echelon grating that is formed with focusing as well as dispersion properties and has advantages over transmissive type echelon gratings becuase it can be achromatized and has higher resolution than its transmissive counterparts of comparable dimensions. As can be seen, device 10 comprises a thin, transparent dielectric substrate 12 with an index of refraction, $n_0$. Atop substrate 12, integrally formed with it, sits a thin light conducting layer 13 that has an index of refraction, $n_1$, that is larger than the index, $n_0$. Above layer 13 is air or there may be another layer having an index of refraction that is smaller than $n_1$.

Although of one piece, layer 13 can be thought of as subdivided into three distinct regions including a channel guide fan-out region 14, a surface guiding region generally at 16 and a grating region 18 that consists of a milled stepped surface 20 that has a mirror coating applied to it. Substrate 12 and layer 13 may be formed of any suitable materials amenable to photolithographic and etching techniques. These materials include any used in the fabrication of optical fibers such as silica or germania glass, but preferably are formed of a material such as synthetic silicon dioxide in which the necessary index changes required may be achieved through the use of appropriate masks in conjunction with suitable doping techniques.

Formed in the channel guide fan-out region 14 are a series of waveguides designated generally at 22. As can best be seen in FIG. 1, the waveguides 22 are grouped rather closely on the right and progressively separate more and more as they approach the left edge of layer 13. Waveguides 22 function as conduits for illuminating and receiving illumination from the stepped echelon surface 20. For convenience, the central waveguide of the group 22 may be assigned the role of the trunk line along which multiplexed signals travel. The light to be demultiplexed emerges from this waveguide within its numerical aperture (N.A.) and is contained by the surface guiding region 16 in the usual way by proper adjustment of the indices, $n_0$ and $n_1$, and the geometry of layer 13. After the light emerges from the central waveguide 22, it radiates outward from its end as a cylindrical wavefront. The full angle of radiation is determined by the numerical aperture of the radiating guide. The outward radiating wavefront is then incident on the reflection echelon grating surface 20.

The echelon grating surface 20 consists of a curved multistep structure that, as can be seen, is comprised of sections which are radii with respect to the source point, i.e., the end of the central waveguide, and sections (21) which are arcs of circles centered on the source point. Thus, since the grating step size, i.e., the radii sections (t), must be all equal in size, the length of the circular sections (21) increase in proportion to the radial position of the individual circular sections with respect to the source point. Each arc section (21) thus subtends an angle 0 with respect to the source point. This type of pattern is used so that each circular section intercepts the same optical power as all the other circular steps.

It should be apparent that the reflection grating surface 20 is blazed to reflect light directly back to or close to the position of the source point. Reflection back to the exact source point will occur if the (constant) radial step size at any light frequency is a half integral number of wavelengths of light in the media. For non-half integral wavelengths of light, the diffracted light is reflected back in a direction close to the source point and is collected by one of the many waveguides (22) adjacent one another near the central waveguide acting as the source.

A significant feature of the device is that the grating 20 is blazed at all such wavelengths, i.e., wavelengths for which the echelon round trip step delay is equal to an integer numer of wavelengths. That is, the light power reflected at all such wavelengths is substantially the same. This beneficial result occurs only for this type of reflection grating containing circumferential circular reflecting elements. It does not occur for transmission gratings which exhibit substantial amounts of chromatic aberration.

For purposes of illustration, assume that the step size of the echelon grating surface 20 is one millimeter and that the index of the medium, that is, of layer 13, is 1.5. Then the total round trip increase in optical distance per step is equivalent to a 3 millimeter path length in air. This distance corresponds to an increase of 3,000 wavelengths of light at one micron wavelength. In more common terms, the grating is said to be operating in the $3,000^{th}$ order of diffraction. It is clear that a change of one length in 3,000 will also cause light to be efficiently reflected back to the source point. This one-three thousandth change corresponds to a wavelength change of 3.3 Angstroms, or more precisely, a frequency shift of 100 GHz. It is evident, therefore, that this particular type of echelon grating diffracts light back to the source with equal efficiency at an infinite number of frequencies all substantially equally spaced. Therefore, the grating structure acts in a manner which is similar to a Fabry Perot or ring resonator filter and can be used in exactly the same way with the same benefits. In the present case, the difference in frequency between adjacent orders of diffraction is equivalent to the free spectral range of resonator filters. In particular, two echelon grating filters of slightly differing step size can be used in succession to create a vernier filter to distinguish between two wavelengths that would otherwise pass through the same ports of a single echelon filter. Moreover, because of the capability to use many orders of diffraction, a laser source of any wavelength can be used with a particular echelon grating. All wavelengths which have the same fractional wavelength excess with respect to the step size are diffracted into the same direction which lies close to the source point. That is, one can construct a wavelength multiplexed system using an inventory of one laser type if the laser can be tuned thermally or via current control over the wavelength range corresponding to one order of diffraction. Semiconductors lasers can typically be tuned over a range of approximatey 30 Angstroms so that in this case the step size can be as small as 0.1 millimeters in glass.

The fact that single echelon reflection grating of this type can be used over a wide wavelength range provides a significant advantage from the manufacturing viewpoint. Namely, a single grating structure can be used by many users each at very different wavelengths. Thus, one need only manufacture one echelon grating device to satisfy applications covering a wide range of wavelengths. The inventory of manufactured grating multiplexers can therefore be reduced as compared with a low order diffraction grating multiplexer which must be operated at precisely predefined wavelengths.

It should also be noted that refractive grating structures or flat reflection gratings used in conjunction with lenses produce a focus plane that is obliquely tilted with respect to the center line of the radiated light beam and that such a tilted plane causes design complications.

The echelon grating must be manufactured so as to creat mirror facets perpendicular to layer 13 of the integrated optic device. Such perpendicular surfaces can be prepared by a variety of techniques including ion beam milling and r.f. plasma etching or other suitable etching capable of maintaining perpendicularity requirements over one or more wavelength depths as the case may be.

It is believed that this type of integrated optic grating device has all the desired features and is as good as one which might be achieved via lens elements and utilizing a linear reflection diffraction grating, but without the problems of such a device. In particular, it is clear that it is more easily fabricated using photolithographic and etching techniques compared to the usual bulk optic approach of grinding each facet individually.

The resolution of the grating surface 20, assuming that each of the circumferential arc portions equal, is defined in conventional terms as that $\Delta\lambda$ for which the new principle maxima of one wavelength falls on the first adjacent minima of the second wavelength. It can be shown that the resolution expressed in mathematical terms is:

$$\lambda/(\Delta\lambda) = Nm; \qquad (1)$$

where N is equal to the number of steps in the echelon grating surface 20 and m is the order of diffraction expressed by an interger. Rewritten in terms of the index of refraction of layer 13, an alternate expression for the resolution is:

$$\lambda/(\Delta\lambda) = (2Nn_1 t)/\lambda; \qquad (2)$$

where t is equal to the radial distance between steps.

For two wavelengths separated by the limit of wavelength resolution, the angular separation may be expressed as:

$$\Delta\theta = \lambda/(n_1 Nd); \qquad (3)$$

where d is the nominal width of each step. The overall length of the echelon grating surface 20 is simply the product of the number of steps times the radial distance separating steps, Nt, and is determined by the required wavelength resolution while the overall width is approximately Nd and is determined by the required angular dispersion between wavelengths. N itself is determined by the total number of wavelengths one wants to resolve between two consecutive principle maxima.

As an example, suppose one wanted to design an integrated optic echelon grating multiplexer/demultiplexer to separate 20 wavelengths with a mean $\lambda$ equal to 1 $\lambda$m and $\Delta\lambda$ equal to fraction of an Angstrom, say 0.17 Angstroms. This requires a resolution, $\lambda/\Delta\lambda = 60,000$. For a glass planar guide $n_1$ is equal to 1.5. Therefore, equation (2) implies an echelon length, $Nt = 2$ centimeters. With an angular separation of, say, $10^{-3}$ radians, equation (3) implies a grating width Nd $\simeq 0.7$ millimeters. Since N equals the number of wavelengths to be demultiplexed, we use $N=20$ to get $t=1$ millimeter and $d=35$ micrometers. These step widths and lengths can easily and reproducibly be achieved by using well-known photolithographic techniques used for fabricating integrated optics devices.

The scale of waveguides 22 will depend on how many fiber modes are being used for communication purposes. Although more than one mode is possible, the device is preferably operated single mode since its resolution decreases with increasing mode usage. Assuming single mode, the ends of waveguides 22, where they are closely grouped at the right, will be on the order of one to a few wavelengths so that their spatial separation is roughly the same and can be adjusted by careful choice of angular dispersion and location of the ends of waveguides 22 with respect to grating 20. The larger separation of waveguides 22, at the left, is for accommodating the larger diameters of fibers which are to be butt-coupled to carry away the demultiplexed channels.

Other embodiments acting as transmission devices are possible. With these kinds of devices, diffraction takes place across a dissimilar boundary which itself is the echelon grating, and the resolution is given by:

$$\lambda/(\Delta\lambda) = (N(n-n_0)t)/\lambda \qquad (4)$$

Figure 3:
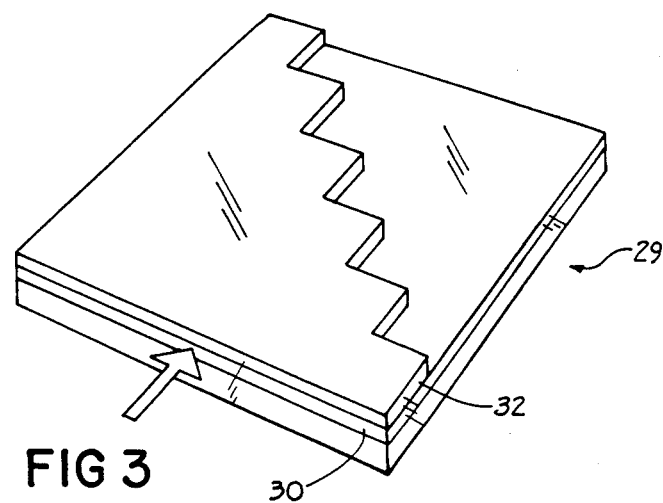
FIGS. 3-5 are diagrammatic perspective views of different transmissive embodiments of the integrated optic device of the invention.
Figure 4:
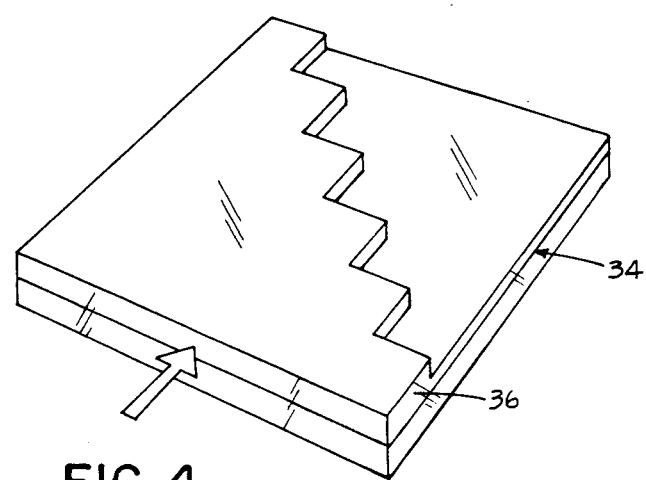
Figure 5:
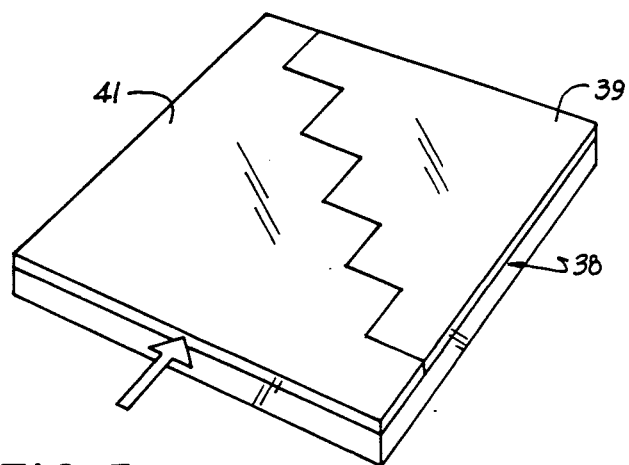

Examples of transmissive embodiments are illustrated in FIGS. 3–5.

In FIG. 3, a planar substrate 29 has a layer 32 overlying another layer 30 having a different index. This perturbs the effective index of the guided mode to n and $n_0$ under and outside the overlay region, respectively.

In FIG. 4, a planar substrate 34 includes a guiding layer 36 that is etched to a depth that is small compared to its overall depth. The remainder, a stepped layer, is treated to provide a proper index. This etched guiding then has two regions of different effective index. This perturbs the effective index to produce the n and $n_0$ regions across the stepped boundary.

In FIG. 5, a planar substrate 38 is made up of two layers 39 and 41, respectively, of two different materials such that the effective index in the two regions, interfaced as the echelon, is n and $n_0$, respectively. This structure allows the largest values for the quantity $(n-n_0)$ which can be as much as 0.3 to 0.4.

In the embodiments illustrated in FIGS. 3–5, it will be appreciated that a fan-out regions similar to that illustrated in connection with the reflection device of FIG. 1 can easily be incorporated into these as well. Coupling to and from the transmissive devices of FIGS. 3–5 may take on various forms depending upon the particular application. Unlike the reflection form of the invention, however, input is always on one side of the echelon and output on the other.

Figure 6:
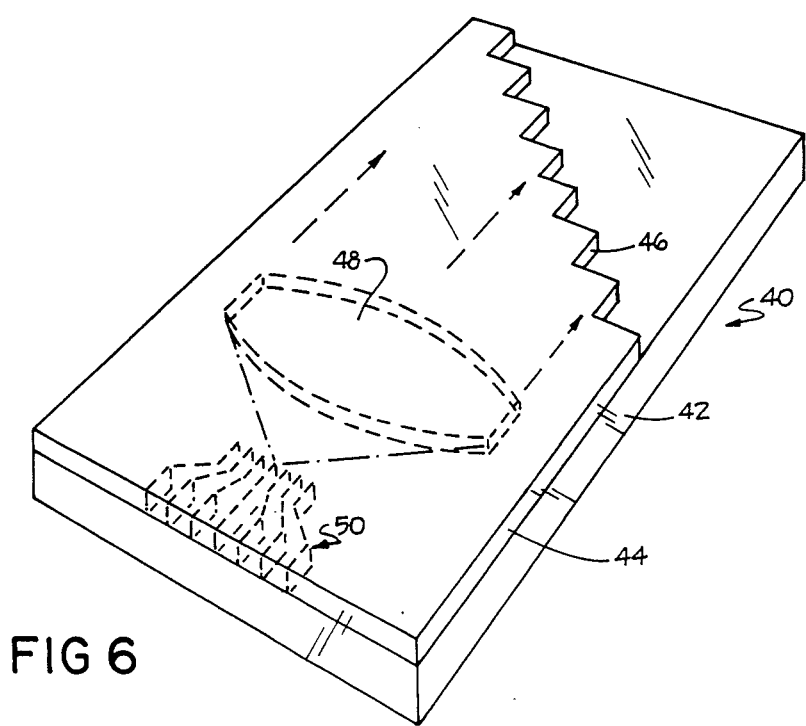
FIG. 6 is a diagrammatic perspective view of another reflection embodiment of the invention.

Other more complex forms of the reflection type incorporating lensing regions for purposes of focusing diffracted orders are also possible. FIG. 6 illustrates one such possibility. Here, a reflection device 40 is shown comprising a substrate 42 which is overlaid by a second layer 44 that is selectively etched away to form the echelon grating structure indicated at 46. The vertical surfaces of the echelon grating structure 46 are then coated with reflective material. Layer 44 is then selectively treated utilizing ion exchange techniques or other suitable techniques to locally change the index of refraction to form in it lens-like regions such as that indicated generally at 48. Here the cylindrical lens region 48 accepts the multiplexed signals and collimates them, directing them onto the grating structure 46. Waveguiding region 50 is formed in a manner similar to that used in forming lens 48. The demultiplexed signals are then, after diffraction, refocused by lens 48 to waveguide 50. The index of layer 44, outside of these special regions, is set in the usual way, and its geometry is also set for proper waveguiding purposes.

The primary advantages to the integrated optic echelon gratings disclosed here are threefold: ease of fabrication, high wavelength resolution, and temperature stability.

A line grating normally requires submicron lithography. In contrast, the smallest dimension in an echelon grating is on the order of several tens of microns. In an integrated optic echelon grating, the resolution can easily be 5,000 or more and, indeed, for one example illustrated, the resolution was 60,000. A line grating used in the first order needs 5,000 lines for corresponding resolution to that of the integrated optical echelon grating. The integrated optical echelon grating is extremely temperature stable, requiring roughly 1,000° C. to create a phase difference of $2\pi$, i.e., the T needed to go through a complete order to get from one principle maxima to the next. The T to tune through the wavelength resolution limit, however, is T/n, which is approximatey 50° C. for n=20. Therefore, it is apparent that such gratings are very temperature stable, yet tunable.

It will be recognized by those skilled in the art that the planar devices of the invention supports two kinds of modes. One is the TE which has it polarization parallel to the major surface and the other the TM mode that is perpendicular to the major surface. The effective refractive index in these two directions is different even with isotropic materials and hence the angular separation is also different. Therefore, the TE and TM modes end up at different spatial locations. This, however, is controllable by controlling polarization with the incoming fibers or waveguides.

It will be obvious to those skilled in the art that other changes may be made in the above-described embodiments without departing from the scope of the invention. Therefore, it is intended that all matter contained in the above description or shown in the accompanying drawings shall be interpreted as illustrative and not in a limiting sense.

What is claimed is:

1. An integrated optic device comprising a thin, planar substrate made of a transparent dielectric material and having integrally formed therein, perpendicular to the major plane of said substrate, an echelon grating structured to receive electromagnetic radiation within a given bandwidth and diffract it into components of different wavelength angularly dispersed with respect to one another so that at a predetermined distance away from said echelon grating said components are spatially separated for individual coupling and subsequent use, said echelon comprising a plurality of steps whose physical dimensions are at least several times larger than the wavelength of radiation encompassed by said given bandwidth to provide said device with a high resolution for separating a plurality of communication channels closely spaced in wavelength and for facilitating the fabrication of said echelon grating in integrated optic format using either photolithography, ion milling, or r.f. plasma etching.

2. The integrated optic device of claim 1 wherein said echelon grating is reflective.

3. The integrated optic device of claim 2 wherein said reflective echelon grating is curved to provide it with focusing properties.

4. The integrated optic device of claim 3 wherein said reflective echelon grating comprises a plurality of steps having predetermined widths and height wherein said step widths are segments of concentric cylinders.

5. The integrated optic device of claim 1 wherein said echelon grating is transmissive.

6. The integrated optic device of claim 1 wherein said device is fabricated using photolithographic and etching techniques.

7. The multi/demultiplexer of claim 1 wherein the resolution of said echelon grating is within the range between 6000 and 15,000.

8. The multi/demultiplexer of claim 1 wherein said plurality of steps of said echelon grating are configured and arranged for resolving between 20 and 50 communications channels separated in wavelength from between 1 and 10 Angstroms.

9. An integrated optic multi/demultiplexer comprising a thin, planar substrate made of a transparent dielectric material and having integrally formed therein:
(a) at least one section defining a slab waveguide along which radiation within a given bandwidth can propagate;
(b) at least two channel waveguides for emitting and receiving optical signals, within said bandwidth, to and from said slab waveguide; and
(c) an echelon grating positioned along said waveguide and structured to intercept radiation propagating within said slab waveguide and diffract it into components of different wavelength angularly dispersed with respect to one another so that at a predetermined distance from said echelon grating said components are spatially separated at locations corresponding to those of said channel waveguides, said echelon grating comprising a plurality of steps whose physical dimensions are at least several times larger than the wavelength of radiation encompassed by said given bandwidth to provide said multi/demultiplexer with a high resolution for separating a plurality of optical signals closely spaced in wavelength and for facilitating the fabrication of said echelon grating in integrated optic format using either photolithography, ion milling, or r.f. plasma etching.

10. The multi/demultiplexer of claim 9 wherein said echelon grating is a reflective grating and said steps thereof have given widths and lengths where said widths are segments of concentric cylinders.

11. The multi/demultiplexer of claim 9 wherein the resolution of said echelon grating is within the range between 6000 and 15,000.

12. The multi/demultiplexer of claim 9 wherein said plurality of steps of said echelon grating are configured and arranged for resolving between 20 and 50 communications channels separated in wavelength from between 1 and 10 Angstroms.

13. A method for fabricating an integrated optic multi/demultiplexer comprising a thin, planar substrate made of a transparent dielectric material, said method comprising the steps of:
(a) forming within said substrate at least one section defining a slab waveguide along which radiation within a given bandwidth can propagate;
(b) forming within said substrate at least two channel waveguides for emitting and receiving optical signals, within said bandwidth, to and from said slab waveguide; and
(c) forming within said substrate an echelon grating positioned along said waveguide and structured to intercept radiation propagating within said slab waveguide and diffract it into components of different wavelength angularly dispersed with respect to one another so that at a predetermined distance from said echelon grating said components are spatially separated at locations corresponding to those of said channel waveguides, said echelon grating comprising a plurality of steps whose physical dimensions are at least several times larger than the wavelength of radiation encompassed by said given bandwidth to provide said multi/demultiplexer with a high resolution for separating a plurality of optical signals closely spaced in wavelength and fabricated using either photolithography, ion milling, or r.f. plasma etching.

* * * * *